Figure 1:
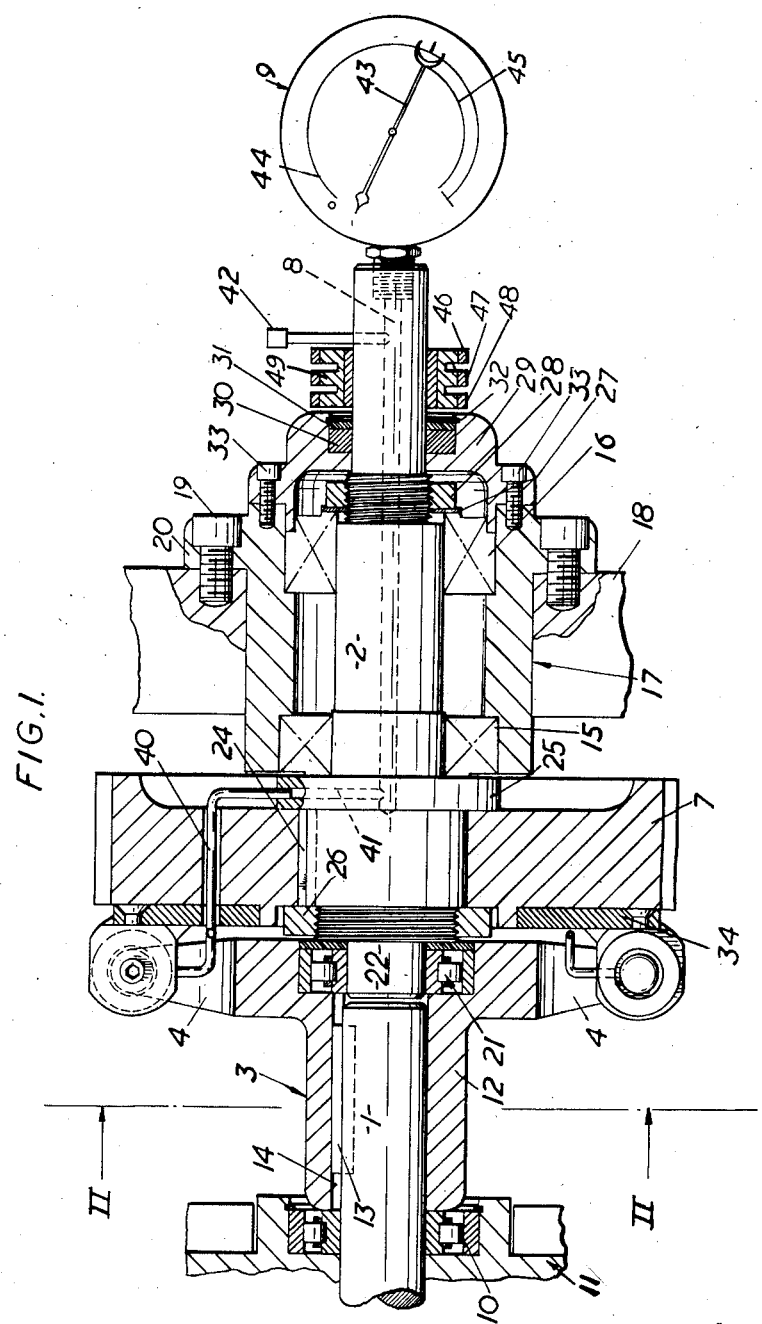

April 11, 1961 D. C. NICHOLAS 2,978,903
TORQUE TRANSMISSION COUPLING
Filed March 20, 1957 2 Sheets-Sheet 1

Inventor
Donald Cameron Nicholas
By Bacon & Thomas
Attorneys

April 11, 1961  D. C. NICHOLAS  2,978,903
TORQUE TRANSMISSION COUPLING
Filed March 20, 1957  2 Sheets-Sheet 2
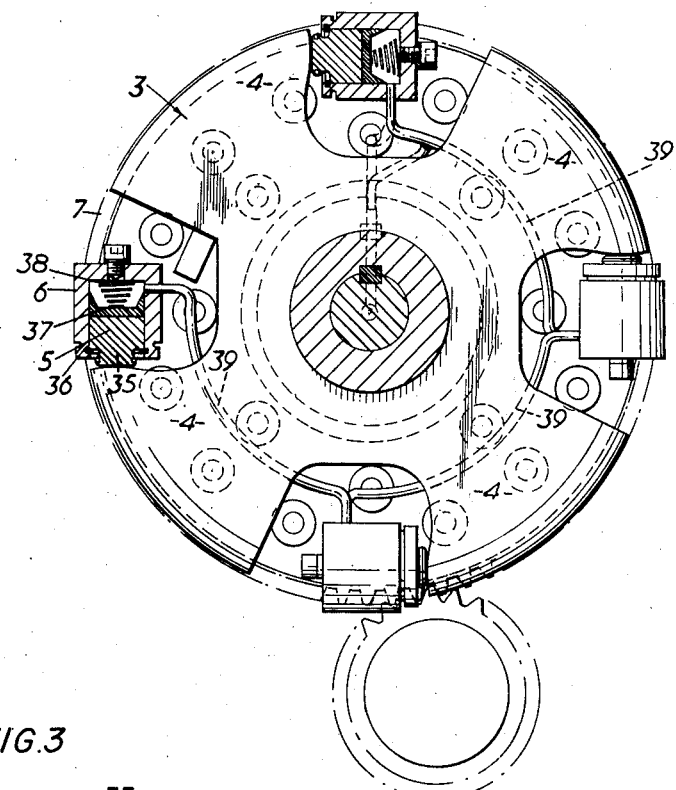
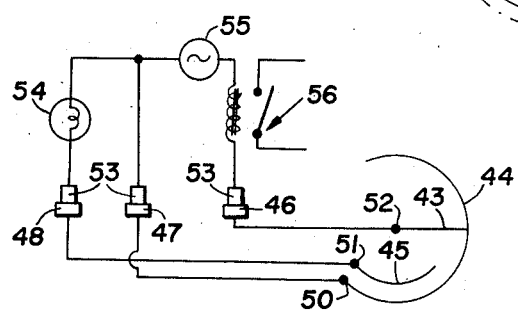
Inventor
Donald Cameron Nicholas
By Bacon & Thomas
Attorneys

United States Patent Office 2,978,903
Patented Apr. 11, 1961

2,978,903

TORQUE TRANSMISSION COUPLING

Donald Cameron Nicholas, Ipswich, England, assignor to B.X. Plastics Limited, Highams Park, London, England, a British company Filed Mar. 20, 1957, Ser. No. 647,431

Claims priority, application Great Britain Mar. 23, 1956

2 Claims. (Cl. 73—136)

The present invention relates to a torque transmission coupling. More particularly the invention relates to a torque transmission coupling for transmitting drive to plastic extruding machines in general and in particular to the twin drive shaft assemblies of double screw plastic extruding machines. A plastic extruding machine is normally provided with a variable speed drive and these drives usually have a characteristic which gives rising H.P. with rising speed. The electric motor which usually drives the machine is normally provided with starter and overload protection. However the overload protection must be such that the machine can be run at maximum speed under normal conditions and in consequence it is possible at lower speeds of the motor for it to exert a greater driving torque upon overloading without actuating the overload protection than when running at maximum speed and H.P.

This contingency will where possible be provided for in the design of any machine but as explained in my copending application No. 647,261, filed March 20, 1957, now Patent No. 2,892,362, the design of twin drive shaft assemblies for double screw plastic extruding machine is subject to certain inherent limitations which drastically limit the strength thereof and render it impossible effectively to provide for the above contingency with the result that such assemblies may frequently be damaged by overloading arising in the manner described and to avoid this a shear pin coupling is often provided. A shear pin coupling is however unsatisfactory since once the pin has sheared the machine is rendered inoperative until the pin is replaced which may take some considerable time. Moreover it is always possible for a pin accidentally to be employed which is not of the correct strength and through which the assembly may be overloaded.

In research and production work on the extrusion of plastics it is frequently important to obtain an accurate assessment of the power input to the machine in order to determine the degree of frictional heat generated in the screws and this has proved difficult in view of unknown factors such as frictional losses in the gear box and unknown factors in connection with the electrical characteristics of the drive motor.

It is an object of the present invention to provide a torque transmission coupling which enables the maximum torque transmitted to be controlled and/or enables the power transmitted by the coupling to be accurately assessed.

Thus according to the present invention there is provided a torque transmission coupling comprising two coaxial shafts, one of said shafts having one or more engaging means offset from its axis and the other shaft having a corresponding number of abutments disposed for engagement by said engaging means to couple the shafts together for rotation, each said engaging means being such as to transmit force arising from contact between it and its respective abutment to further means associated therewith which are variably responsive according to the magnitude of the transmitted force and serve to actuate indicating means enabling a continuous reading of the torque at the coupling to be obtained and/or means for preventing the magnitude of the torque at the coupling exceeding a predetermined maximum value.

Whilst the said shafts may be respectively so formed as to constitute a mounting for the said engaging means and to provide the said abutment(s), it is preferred that the said engaging means and abutment(s) form part of members mounted upon and keyed with respect to the said shafts in any convenient manner.

Preferably the said further means comprises a hydraulic system which communicates with each said engaging means and is connected to means responsive to variations in the liquid pressure therein. Thus the system may be connected to a pressure gauge mounted on the free end of the said one shaft through an axial bore therein. The liquid employed in the said system is preferably an oil. The pressure gauge may be calibrated to give a direct reading of the torque at the coupling if so desired and/or the response of the gauge may be utilised at a certain predetermined maximum desired torque to operate means for disabling the means driving the coupling or for causing the torque transmitted by said means to be reduced. Thus, for example, the indicator of the gauge may at a deflection corresponding to a predetermined maximum desired torque, serve to complete or open an electric circuit and thereby serve to operate means which disable the said driving means or alternatively cause the torque delivered to the coupling by the said driving means, to be reduced.

Where the said further means comprises a hydraulic system as above, it is preferred that the engaging means each comprises a piston and cylinder mounted with their longitudinal axes tangential to the axis of rotation of the shafts. It will be appreciated that the movement of the piston will be negligible in serving to transmit the force between it and the abutment to the fluid behind it in the cylinder which forms part of the hydraulic system. Hence it will be apparent that the piston may if desired be replaced by a diaphragm of suitable strength and flexibility which will serve under the influence of the force between it and the abutment to pressurise the hydraulic liquid. It will however be realised that in calibrating the pressure gauge to indicate directly the torque at the coupling allowance must be made for the resilience of the diaphragm itself taking up part of the force between it and the abutment. Alternatively the piston may be replaced by a seamless corrugated bellows of suitable robust construction. The engaging means need not operate upon the hydraulic liquid directly but may so operate indirectly through any other means e.g. a mechanical linkage.

It will of course, be appreciated that since in operation the coupling will be rotating any electrical connections to rotating parts will necessarily have to be through a sliding contact arrangement.

In order that the invention may be well understood there will now be described with reference to the accompanying drawings and by way of example only, one preferred embodiment thereof which serves both to indicate continuously the magnitude of the torque at the coupling and to prevent the magnitude of the said torque exceeding a predetermined maximum value. In the drawings, Fig. 1 is a side elevation in section;

Fig. 2 is a sectional view on the line II—II of Fig. 1 with additional parts of the coupling not on the section line also in section to show details of construction; and Fig. 3 is a wiring diagram showing the circuits involved in the electrical features of the invention.

The coupling illustrated in the drawings comprises generally a driven shaft 1 and a coaxial driving shaft 2, The driven shaft 1 has a spider 3 keyed on the end thereof whose arms 4 provide abutments which are engaged by four engaging means which each comprise a piston 5 disposed within a cylinder 6 which is offset from the axis of the drive shaft 2. The drive shaft 2 is driven through a gear 7 keyed thereon. The cylinders 6 behind the pistons are in communication with one another and with a central bore 8 in the shaft 2 which bore communicates with a pressure gauge 9 mounted on the end of the shaft 2. The cylinders, communicating passages and the said bore are filled with oil and constitute a closed system. In this manner the force between the pistons 5 and the arms 4 of the spider 3 is transferred to the liquid and results in a response of the pressure gauge 9 proportional to the torque at the coupling and the gauge is in fact calibrated to read directly in pounds/feet.

The shaft 1 is shown as forming part of apparatus 11 to be driven through the coupling and will be journalled in bearings one of which is shown at 10. The shaft 1 may for example be the driven shaft 7 of the twin drive shaft assembly which forms the subject matter of my said copending application No. 647,261.

The said spider 3 comprises a tubular portion 12 from one end of which the said radial arms 4 extend. The spider 3 is mounted on the end of the shaft 1 by means of a key 13 engaging in a slot 14 formed in the inner surface of the tubular portion 12 thereof and in a recess in the shaft 1 formed to receive it.

The shaft 2 is journalled in bearings 15, 16 mounted within the opposite ends of a tubular member 17. The member 17 is disposed in a seat formed in a wall 18 of a housing (not shown in full) for the coupling and is secured to the said wall 18 of the housing by screws 19 which pass through a flange 20 of the member 17 into the said wall. The end 22 of the shaft 2 adjacent the end of the shaft 1 is of reduced diameter and is journalled in a bearing 21 disposed in a recess formed to receive it in the end of the tubular portion 12 of the spider 3.

Adjacent the end 22 of the shaft 2 is the annular gear 7 which is keyed onto the shaft 2 by a key 24 and is located axially on the shaft between a flange 25 of the shaft and a lock nut 26 threaded on the shaft 2.

The said bearings 15, 16 are both thrust bearings and the shaft 2 is located axially with respect to the member 17 in the following manner. The said flange 25 abuts against the thrust bearing 15 whilst a washer 27 held by a nut 28 threaded on the shaft 2 abuts against the bearing 16. In this manner the shaft 2 is held against axial displacement.

A closure member 29 is provided for the end of the tubular member 17 which closely surrounds the shaft 2 and is secured by screws 33 to the said member 17 and provides a housing for an oil seal 30 which is held in position by an annular plate 31 and snap ring 32.

The face of the annular gear 7 facing the spider 3 is provided with an annular recess to receive an annular backing plate 34 to which the said four cylinders 6 are secured by welding with their axes tangential to the axis of rotation of the shafts 1, 2. These cylinders 6 are equispaced around the plate 34 and are all at the same radius from the axis of the shaft 2. The piston 5 within each cylinder is provided with a portion 35 of reduced size which engages the side of the respective radial arm 4 of the spider 3. The pistons are retained within the cylinders by means of snap rings 36. A liquid seal 37 is provided in contact with the inner end of each piston and is maintained in contact therewith by a coil spring 38 disposed between it and the base of the cylinder 6. The springs 38 also serve to maintain the pistons 5 in their outermost positions in engagement with the snap rings 36 at no load.

As best shown in Fig. 2 the cylinders 6 are in communication with one another through tubular connections 39. A tubular connection 40 (see Fig. 1) which extends through an aperture in the gear 7 also connects the cylinders with the end of a radial bore 41 in the flange 25 which bore 41 communicates with the said central bore 8 in the shaft 2 which in turn communicates with the pressure gauge 9 mounted on the end of the shaft 2. An elbow valve 42 is provided in the shaft 2 adjacent the gauge 9 which communicates with the bore 8 and provides means whereby the cylinders, connections etc. may be filled with oil under any desired initial pressure.

It will be apparent that when the spider 3 is driven by the pistons 5 the forces between the pistons and the arms 4 of the spider 3 will be transferred through the oil and reflected in a deflection of the indicator 43 of the pressure gauge 9 which is calibrated to read directly in lbs./ft. torque. It will also be appreciated that since no appreciable movement of the pistons takes place, no friction losses are present to affect the accuracy of the torque reading. It will thus be seen that the present coupling provides an accurate means for determining the torque transmitted and hence also the power transmitted by the coupling to the drive shaft.

However the present coupling is also adapted to prevent the torque transmitted exceeding a predetermined maximum value and to actuate a warning or alarm signal when this maximum torque is approached. To this effect the pressure gauge is provided with two annular strip electrical contacts of silver, 44, 45, see also Fig. 3, mounted on the inner face of the dial and positioned to be engaged by contacts carried by the indicator 43. Three contact terminals 50, 51 and 52 on the gauge 9 are electrically connected respectively with the contacts 44, 45 and the indicator 43. The said terminals are connected by wires to the three rings 46, 47, 48 of a slip ring assembly 49 mounted on the shaft 2. Brushes 53 (Fig. 3) are provided for contact with the rings and are disposed in a housing (not shown) rigidly mounted on the tubular member 17 or closure member 29. These brushes are each electrically connected to an external terminal.

The contact 44 extends around the dial so as to be engaged by the indicator 43 continuously over a range of torques from a small but appreciable torque corresponding to an initial pressurising of the liquid system up to the said predetermined maximum torque. Thus by arranging that the drive motor will only operate when the indicator is in contact with the contact 44 it will be seen that once the indicator passes the maximum torque reading and hence loses contact with the contact 44 the drive motor will be disabled. Furthermore by initially pressurising the liquid system the effect of a leakage therein allowing the cylinders themselves to bear directly against the spider arms 4 and thus render inoperative the above overload protection is avoided since if the pressure within the system falls to atmospheric pressure than the indicator again loses contact with the other end of the contact 44 and the drive motor is disabled.

The contact 45 is disposed for contact by the indicator 43 over a range of torques immediately below the said maximum torque and thus it can be arranged that such contact between the indicator 43 and the strip contact 45 shall cause an alarm device 54 to operate thus giving warning that the torque being transmitted is nearing the predetermined maximum value.

It will be seen that the coupling described provides an accurate means for measuring the torque input to any apparatus and moreover provides a very effective safeguard against overloading. As previously indicated these provisions are of particular advantage in connection with plastic extruding machines. However, it will be appreciated that couplings according to the present invention are not limited to use in connection with plastic extruding machines but may equally well be employed with any apparatus where overload protection and/or accurate measurement of the torque input to the apparatus is required. It is desirable that the coupling should be employed at a point of maximum torque and minimum speed preferably less than 200 r.p.m., to obtain the fastest reaction to overload conditions.

In Fig. 3, numeral 55 indicates a source of current for the circuits shown as numeral 56 indicates generally a relay for completing or breaking the circuit to the drive motor.

Furthermore although one preferred embodiment of a coupling according to the invention has been described in detail it will be understood that alterations and modifications may be made thereto without departing from the scope of the invention.

I claim:

1. A torque transmission coupling comprising two coaxial shafts, one of said shafts having at least one engaging means offset from its axis and comprising means defining an expansible chamber having a movable wall, the other shaft having a corresponding number of abutments disposed for engaging said movable walls to couple the shafts together whereby one shaft may drive the other, means defining fluid-conducting passages communicating with each of said chambers and charged with liquid under pressure, each of said movable walls being arranged to transmit force arising from contact between it and its respective abutment to the liquid within said chamber and passages, a pressure gauge fixedly mounted on said one shaft for rotation therewith and in communication with said passages, said gauge including electrical switch means, said switch means being responsive to liquid pressure applied to said gauge to operate at predetermined maximum and minimum pressures of the liquid in said chambers corresponding respectively to the maximum desired torque to be transmitted by the coupling and to a pressure above atmospheric pressure but below that at which the system is initially pressurized, and sliding contact means establishing electrical connections from said switch means to means remote from said one shaft serving upon operation of said switch means at said minimum pressure to disable the drive to the coupling and at said maximum pressure to prevent any further increase in the torque transmitted.

2. A torque coupling as claimed in claim 1 in which said gauge includes fixed and movable electrical contacts, said movable contact being movable according to the pressure transmitted to said gauge and said contacts being arranged to make electrical contact over a limited range of movement only of said movable contact between positions thereof corresponding to said predetermined maximum and minimum pressures.

References Cited in the file of this patent

UNITED STATES PATENTS

| | | |
|---|---|---|
| 288,728 | Orton | Nov. 20, 1883 |
| 517,439 | Cross | Apr. 3, 1894 |
| 1,685,297 | Shone | Sept. 25, 1928 |
| 1,755,287 | Donavan | Apr. 22, 1930 |
| 1,913,194 | Deitze | June 6, 1933 |
| 2,270,148 | Stowe | Jan. 13, 1942 |
| 2,580,395 | Bellizzi | Jan. 1, 1952 |
| 2,593,000 | Bayless | Apr. 15, 1952 |
| 2,597,514 | Nash | May 20, 1952 |
| 2,709,071 | Hild | May 24, 1955 |